US008589141B2

(12) United States Patent
Lien et al.

(10) Patent No.: US 8,589,141 B2
(45) Date of Patent: Nov. 19, 2013

(54) RESOURCE SHARING APPARATUS WHICH DISCONNECTS AN INPUT DEVICE WHEN DETECTING A STANDBY INDICATION OF A SWITCHING COMMAND

(75) Inventors: Fong Lien, Taipei (TW); Yao-Lung Kuo, Taipei (TW)

(73) Assignee: Aten International Co., Ltd., Shijr (TW)

( * ) Notice: Subject to any disclaimer, the term of this patent is extended or adjusted under 35 U.S.C. 154(b) by 940 days.

(21) Appl. No.: 11/781,993

(22) Filed: Jul. 24, 2007

(65) Prior Publication Data

US 2009/0031049 A1 Jan. 29, 2009

(51) Int. Cl.
*G06F 9/455* (2006.01)
(52) U.S. Cl.
USPC .......................................................... 703/23
(58) Field of Classification Search
USPC .......................................................... 703/23
See application file for complete search history.

(56) References Cited

U.S. PATENT DOCUMENTS

| 5,961,624 | A  | * | 10/1999 | Takayama ...................... 710/314 |
| 6,636,929 | B1 | * | 10/2003 | Frantz et al. .................. 710/313 |
| 6,915,367 | B2 | * |  7/2005 | Gary et al. ..................... 710/244 |
| 6,957,287 | B2 | * | 10/2005 | Lou et al. ......................... 710/72 |
| 7,340,556 | B2 | * |  3/2008 | Lou et al. ...................... 710/316 |
| 2004/0186943 | A1 | * | 9/2004 | Lou et al. ...................... 710/313 |
| 2005/0216620 | A1 | * | 9/2005 | Sandulescu et al. ............ 710/62 |
| 2005/0273312 | A1 | * | 12/2005 | Sandulescu et al. ............ 703/25 |
| 2006/0123182 | A1 | * | 6/2006 | Sandulescu et al. .......... 710/316 |

OTHER PUBLICATIONS

Anonymous. "Hot Key Assignments"[online] Jun. 19, 2006. [Retrieved on Sep. 31, 2009] Retrieved from the internet: <URL: http://forums.linksysbycisco.com/linksys/board/message?board.id=KVM_Switches&message.id=5>.*

Office Action issued by the China State Intellectual Property Office in counterpart application, CN 2008100988472, dated Nov. 13, 2009.

* cited by examiner

*Primary Examiner* — Hugh Jones
(74) *Attorney, Agent, or Firm* — Chen Yoshimura LLP

(57) ABSTRACT

A method for controlling a resource sharing apparatus coupling least one input device to a first host is disclosed. A first input signal is acquired from the input device, and whether the first input signal comprises standby indication of a switching command is determined. The input device is disconnected from the first host when the first input signal comprises the standby indication, and the input device is emulated to the first host.

27 Claims, 5 Drawing Sheets

RESOURCE SHARING APPARATUS WHICH DISCONNECTS AN INPUT DEVICE WHEN DETECTING A STANDBY INDICATION OF A SWITCHING COMMAND

BACKGROUND OF THE INVENTION

1. Field of the Invention

The invention relates to resource sharing, and in particular to a resource sharing apparatus capable of preventing transfer of unnecessary signals during switching.

2. Description of the Related Art

With rapid developments in information technology, computers becoming more prevalent in both homes and offices are often considered requisite "tools" for work, learning, leisure activities, and daily life. Sometimes a user may have more than one computer to process different tasks, often requiring access to multiple computers simultaneously. For example, a user may have one computer dedicated to work, and a second computer limited to non-work activities, such as browsing the Internet and playing video games. Traditionally, each computer is equipped with one set of input/output (IO) peripheral devices comprising, generally, a keyboard, mouse and monitor. However, this is a waste of money and space if one has several computers.

In order to solve such problems, keyboard/mouse/video (KVM) switches allow the same set of IO peripheral devices to interact with selected computers.

BRIEF SUMMARY OF THE INVENTION

A detailed description is given in the following embodiments with reference to the accompanying drawings.

Embodiments of a method for controlling a resource sharing apparatus coupling at least one input device to a first host, in which a first input signal is acquired from the input device, and whether the first input signal includes a standby indication of a switch command is determined. The input device is disconnected from the first host when the first input signal includes the standby indication, and the input device is emulated to the first host.

The invention also provides a resource sharing apparatus capable of selectively coupling an input device to one of a first host and a second host, in which an emulator emulates the input device, and a monitor acquires a first input signal from the input device and outputs a first signal when the first input signal comprises a standby indication of a switch command. A control unit disconnects the input device from the first host and employs the emulator to reply the first host when receiving the first signal.

The invention provides another embodiment of a resource sharing apparatus capable of selectively coupling an input device to one of a first host and a second host, in which first and second emulators emulate the input device, and first and second multiplexers are coupled between the first emulator and the first host and between the second emulator and the second host respectively, and a multiplexer is coupled between the input device and the first and second multiplexers. A monitor acquires first and second input signals from the input device, outputs a first signal when the first signal comprises a standby indication of a switch command, and then outputs a second signal when the second input signal comprises an identifier identifying one of the first and the second hosts. A control unit disconnects the input device from the first host and employs the first emulator to respond to the first host when receiving the first signal, and then establishes a connection between the identified host and the input device when receiving the second signal.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is the best-contemplated mode of carrying out the invention. This description is made for the purpose of illustrating the general principles of the invention and should not be taken in a limiting sense. The scope of the invention is best determined by reference to the appended claims.

Figure 1:
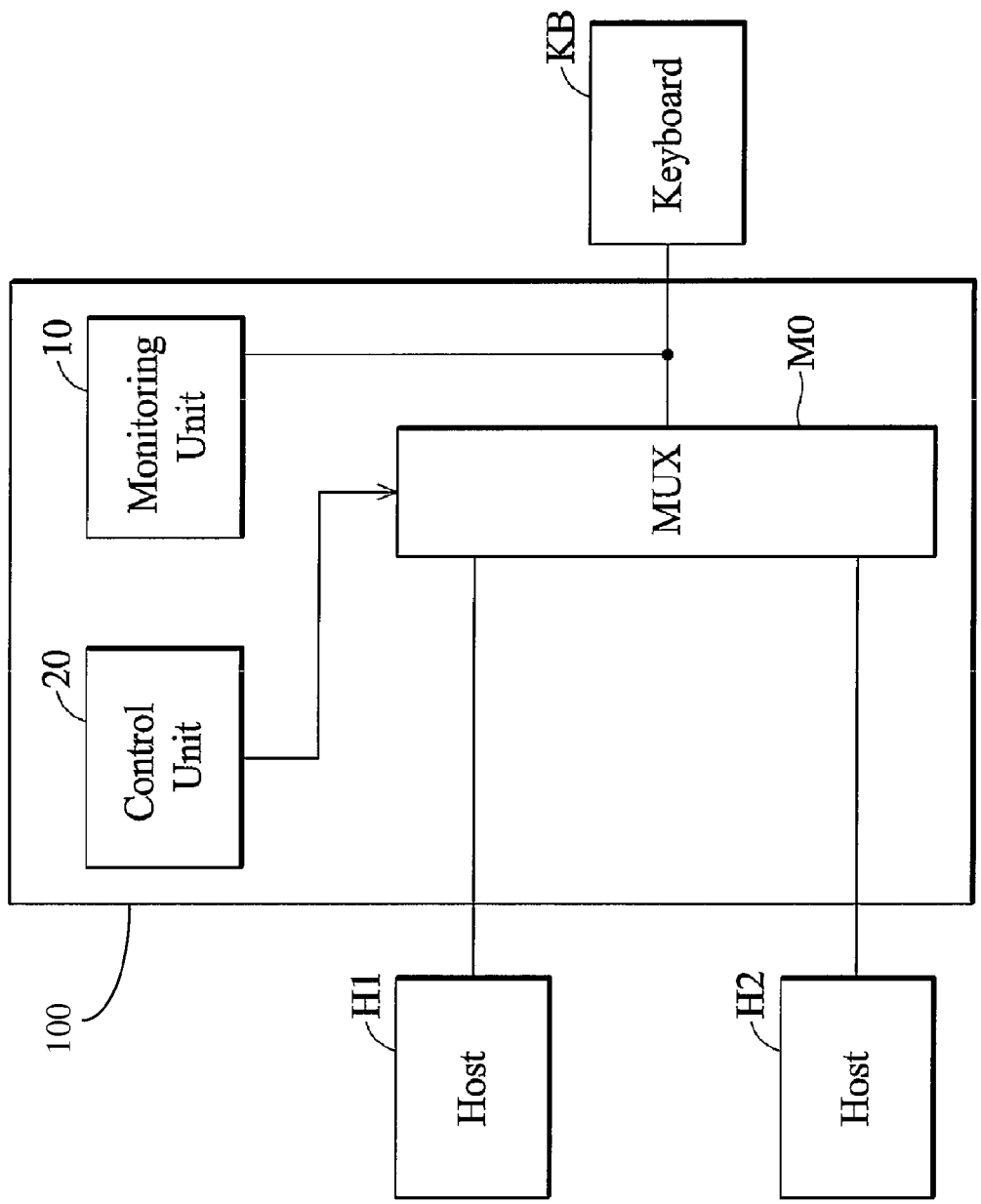
FIG. 1 schematically shows an embodiment of a resource sharing apparatus for sharing a keyboard with several hosts.

FIG. 1 schematically shows an embodiment of a resource sharing apparatus for sharing a keyboard with several hosts. This is not prior art for the purposes for determining the patentability of the invention and is merely shows a problem found by the inventors.

As shown in FIG. 1, resource sharing apparatus 100 is coupled between a keyboard KB and hosts H1 and H2. The keyboard KB is switched to be connected to and interact with the host H1 or H2 according to a switching command from the keyboard KB. For example, the switching command can be a series of keystrokes, such as Ctrl+Ctrl+1 or Ctrl+Ctrl+2. Assuming that at first the host H1 is coupled to the keyboard KB through the multiplexer M0, when a series of keystrokes of Ctrl+Ctrl is detected by a monitoring unit 10, the monitoring unit 10 enters a standby mode to wait for a number identifying host H1 or H2 is to be switched to inactive with the keyboard KB. Because the host H1 is still coupled to the keyboard KB when the keyboard KB inputs the number 1 or 2 to the resource sharing apparatus 100, the number 1 or 2, i.e., the rest of the switching command for the resource sharing apparatus 100, may serve as input data and be transferred to the host H1 and/or a malfunction operation may be executed, and vice versa.

Figure 2:
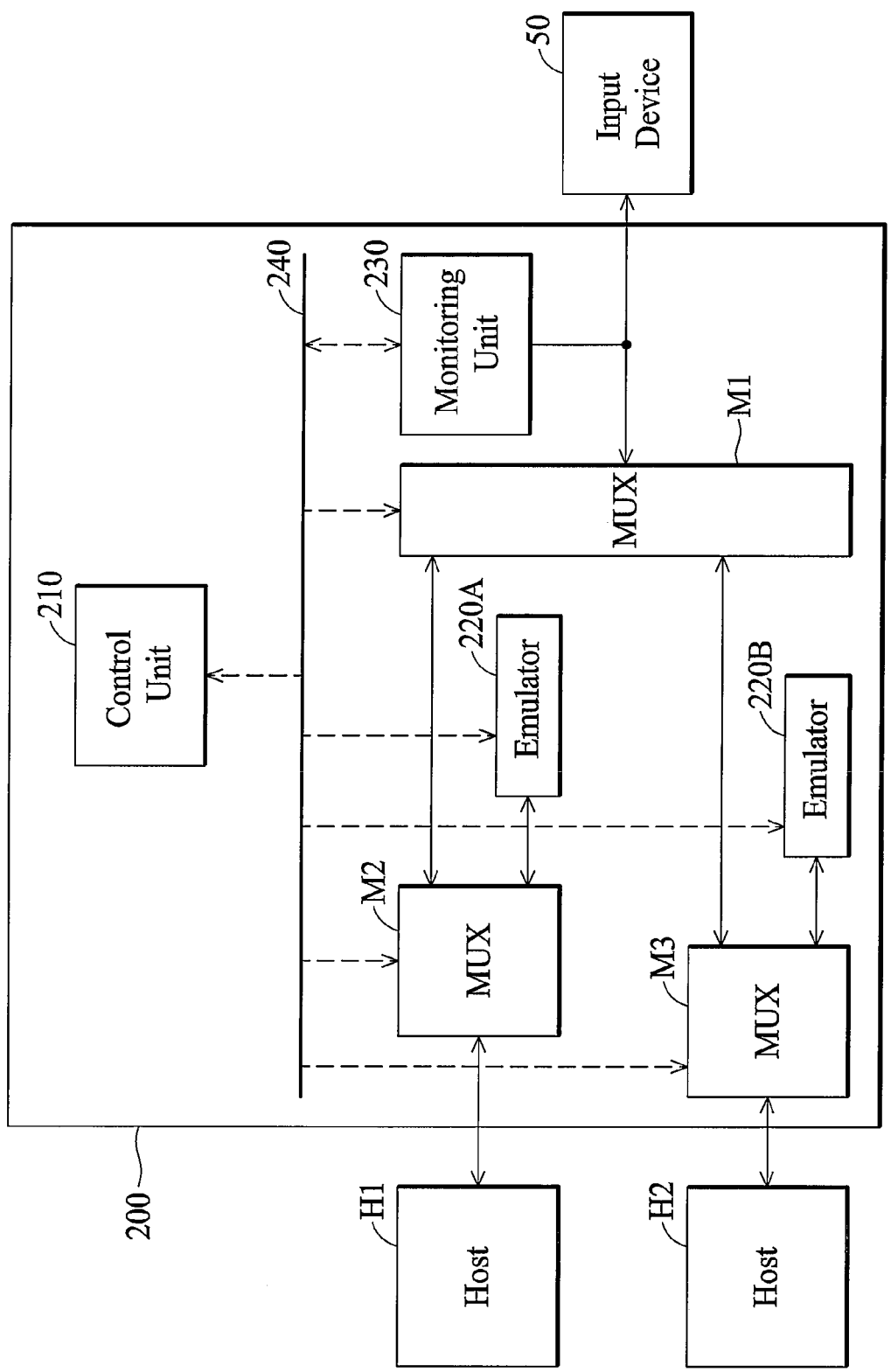
FIG. 2 shows another embodiment of a resource sharing apparatus.

FIG. 2 shows another embodiment of a resource sharing apparatus. As shown, the resource sharing apparatus 200 couples hosts H1 and H2 to an input device 50. The resource sharing apparatus 200 can be implemented as a keyboard-video-mouse (KVM) switch used to allow the same set of IO peripheral devices to interact with a selected one of several hosts. The input device 50, for example, can comprise a keyboard, a keypad, a mouse, a stylus, a touch panel and the like. The hosts H1 and H2, for example, can be desk-top computers, servers or portable computers such as notebooks, tablet PCs, palmtops or UMPC, but are not limited thereto.

The resource sharing apparatus 200 comprises a control unit 210, emulators 220A and 220B, a monitoring unit 230, and multiplexers M1~M3. The control unit 210 is coupled to the emulators 220A and 220B, the monitoring unit 230, and the multiplexers M1~M3 to control operations thereof. The control unit 210, for example, can be a microprocessor or a central processing unit (CPU), but is not limited thereto. The control unit controls operations of the multiplexers M1~M3, and the emulators 220A and 220B.

The resource sharing apparatus 200 is selectively couples the input device 50 to the host H1 and the host H2 according to a switching command from the input device 50. In this embodiment, the switching command is divided into a standby indication indicating that connection between the input device 50 and the host H1/H2 maybe changed (i.e., a host will be selected to receive data input from input device 50) and an identifier identifying one of the first and the second hosts. For example, the standby indication can be generated by a series of keystrokes, such as Ctrl+Ctrl, and the second input signal with the identifier can be generated by a numeral key, such as number 1, number 2 and the like, but is not limited thereto.

The multiplexers M1~M3 are controlled by the control unit 210 to couple the input device 50 or the emulator 220A/220B to the host H1/H2 selectively. For example, the multiplexer M1 between the input device 50 and the multiplexers M2 and M3, can selectively couple the input device 50 to the multiplexers M2 and M3. The multiplexer M2 is coupled between the multiplexer M1, the emulator 220A and the host H1, selectively coupling the input device 50 or the emulator 220A to the host H1. The multiplexer M3 is coupled between the multiplexer M1, the emulator 220B and the host H2, selectively coupling the input device 50 or the emulator 220B to the host H2.

The emulators 220A and 220B are coupled to the multiplexer M2 and M3 respectively and emulate the input device 50 thereby serving as pseudo input devices to response to the host H1 or H2 when needed. After the input device 50 is disconnected from the host H1/H2, and the emulator 220A/200B is coupled to the host H1/H2 through multiplexer M2/M3, the emulator 220A/200B generates a responding signal to respond to the host H1/H2 when the host H1/H2 generates a signal polling the input device 50. For example, the host H1/H2 outputs a polling command, such as IN command, to poll the non-connected input device 50, and the emulator 220A/200B responds to the host H1/H2 by generating a signal, such as negative acknowledge, non-acknowledge or no acknowledge (NAK), to reply the host H1/H2. Thus, the host H1/H2 retries polling the input device 50, and the input device 50 is regarded as available by the host H1/H2. In some examples, the emulators 220A and 220B can be controllers capable of responding to the host H1 or H2. In some embodiments, the emulators can be universal serial bus (USB) device controllers, but are not limited thereto.

The monitoring unit 230 is coupled between the input device 50 and the control unit 210, acquires signals from the host H1/H2 and the input device 50, decodes the acquired signals and outputs corresponding signals (interrupts) to the control unit 210, such that the control unit 210 executes some predetermined resource sharing operations accordingly. For example, when an input signal comprises the standby indication of the switching command, the monitoring unit 230 outputs a first signal to the control unit 210. When receiving the first signal, the control unit 210 enables the multiplexer M2/M3 to disconnect the host H1/H2 from the input device 50, and further establishes a connection between the host H1/H2 and the emulator 220A/220B and to enter a standby mode. When a second input signal comprises an identifier identifying one of the first and the second hosts, the monitoring unit 230 outputs a second signal to the control unit 210 accordingly, such that the control unit 210 establishes a connection between the selected host and the input device 50.

For example, the input device 50 can be coupled to the host H1 through the multiplexer M1 and the multiplexer M2 initially, and the monitoring unit 230 outputs the first signal to the control unit 210 such that the multiplexer M2 disconnects the host H1 from the input device 50 and establishes a connection between the host H1 and the emulator 220A when an input signal comprises the standby indication. As the monitoring unit 230 then receives a second input signal comprises an identifier (for example number 2) identifying the host H2, the monitoring unit 230 outputs a second signal to the control unit 210 such that the control unit 210 controls the multiplexers M1 and M3 to establish a connection between the identified host (i.e. the host H2) and the input device 50. In addition, the control unit 210 controls the multiplexer M2 to disconnect the emulator 220A from the host H1, such that the input device 50 is regarded as unavailable by the host H1.

On the contrary, as the identifier (example number 1) identifies the host H1, the monitoring unit 230 outputs the second signal to the control unit 210 such that the control unit 210 controls the multiplexer M2 to recovery the connection between the identified host (i.e. the host H1) and the input device 50. Namely, the control unit 210 controls the multiplexer M2 to disconnect the emulator 220A from the host H1 and establish the connection between the host H1 and the input device 50 anew. In this embodiment, the input device 50 can be a keyboard, the input signal can be generated by a series of keystrokes, such as Ctrl+Ctrl, the second input signal with the identifier can be generated by a numeral key, such as number 1, number 2 and the like, but is not limited thereto.

Because the input device 50 is disconnected from the host H1 and is not connected to the host H2 yet, the second input signal comprises identification that one of the first and the second hosts, i.e., a part of the switching command for the resource sharing apparatus 200, may not be transferred to the hosts H1 and H2. Therefore, malfunction operations can be prevented. In some embodiments, the multiplexers M1~M3 can be implemented by registers and switches controlled by the control unit 210 to connect or disconnect the input device 50 or the emulators 220A and 220B to the hosts H1 and H2. In some embodiments, the switches can be implemented by transistors controlled by the control unit 210 to connect or disconnect the input device 50 or the emulators 220A and 220B to the hosts H1 and H2.

Figure 3:
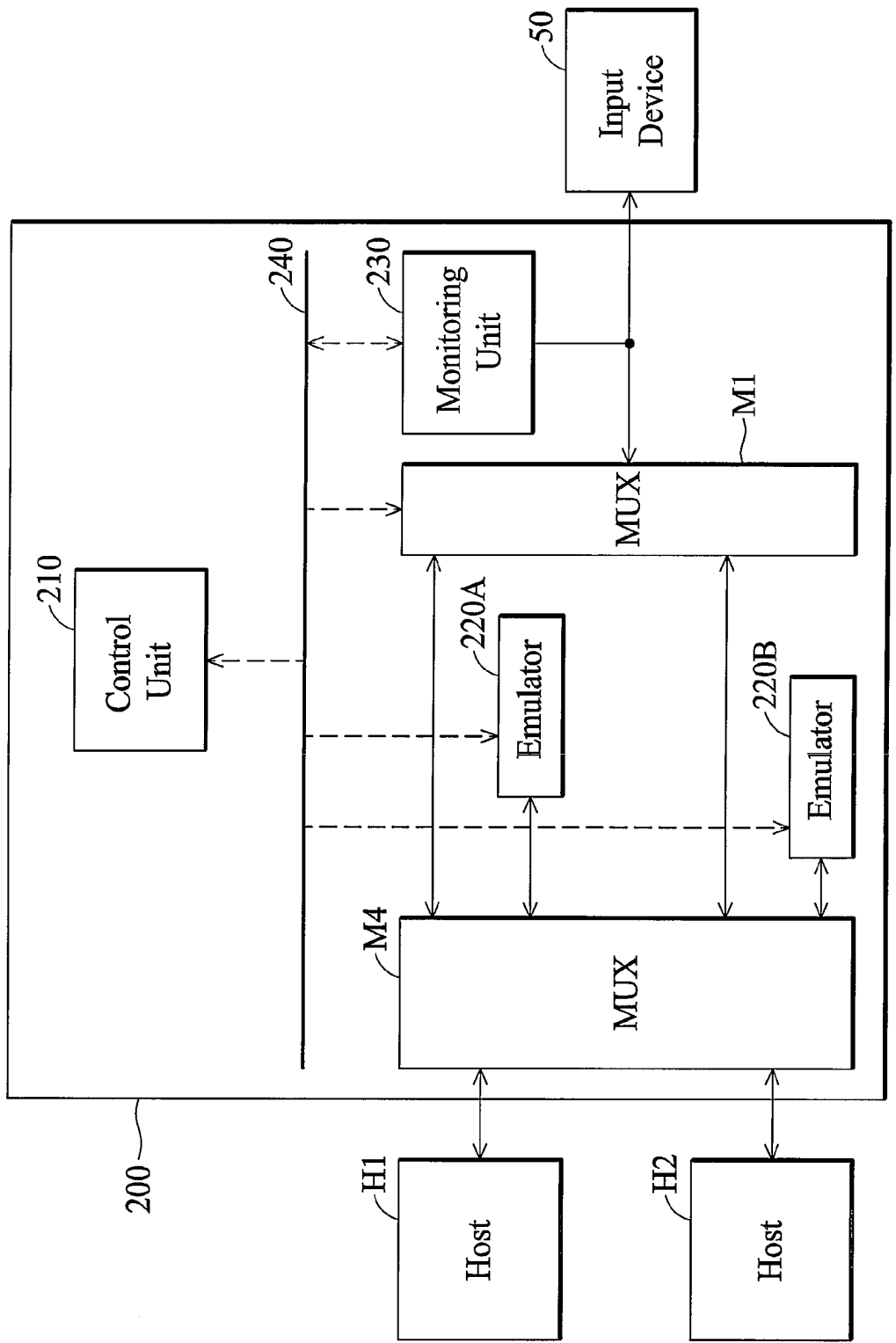
FIG. 3 shows another embodiment of a resource sharing apparatus.

FIG. 3 shows another embodiment of a resource sharing apparatus. As shown, the resource sharing apparatus 300 is similar to the resource sharing apparatus 200 shown in FIG. 2, differing only in that a multiplexer M4 is coupled between the hosts H1 and H2, the emulators 220A and 220B and the input device 50 to control connections thereof rather than two multiplexers M2 and M3.

Figure 4:
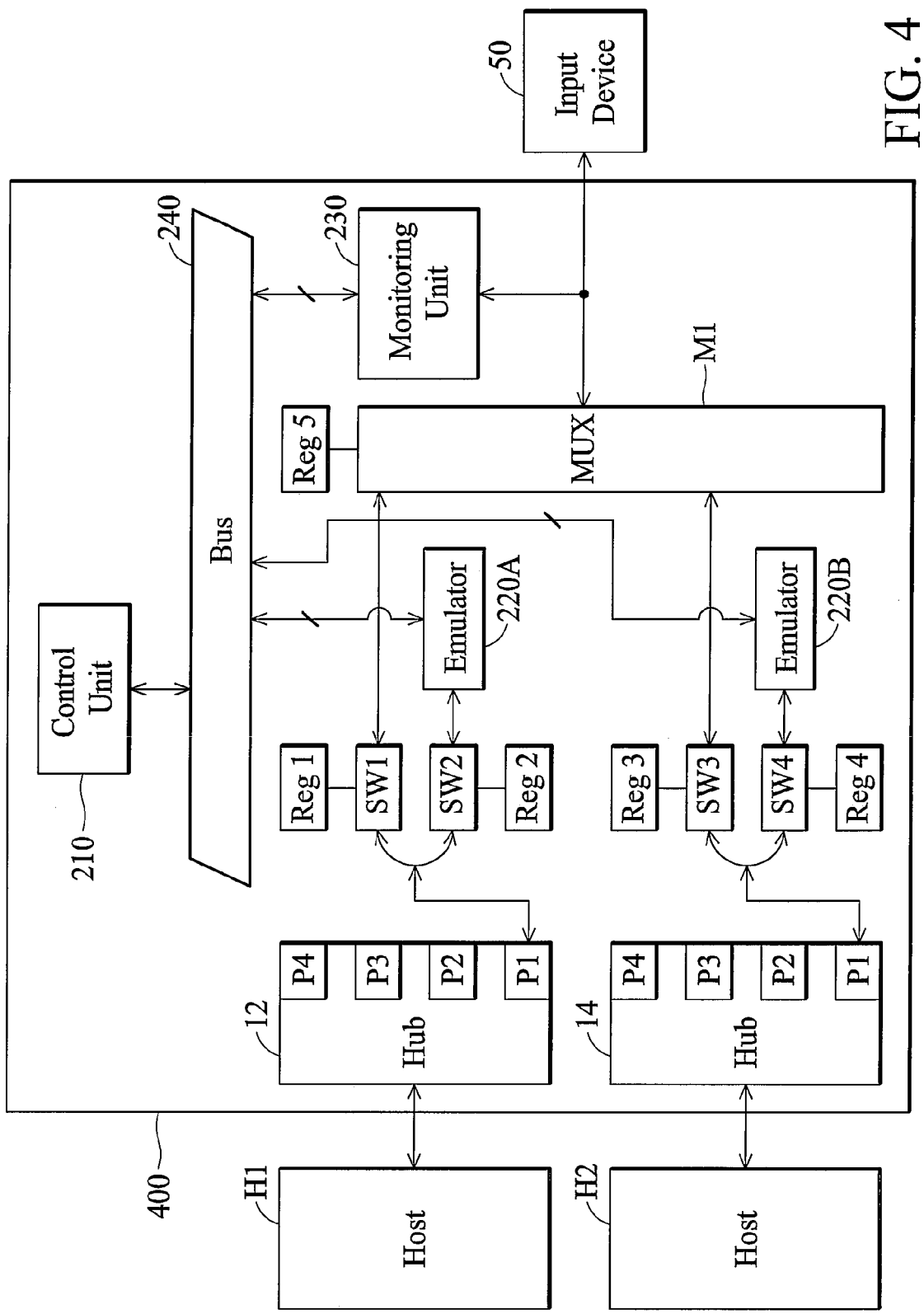
FIG. 4 shows another embodiment of a resource sharing apparatus.

FIG. 4 shows another embodiment of a resource sharing apparatus. As shown, the resource sharing apparatus 400 is similar to the resource sharing apparatus 200 shown in FIG. 2, differing only in that the multiplexers M2 and M3 are implemented by switches SW1~SW4 and registers Reg1~Reg4, two hubs 12 and 14 coupled between the hosts H1 and H2 and switches SW1~SW4, and the control unit 210 is coupled to the emulators 220A and 220B, the monitoring unit 230 through the bus 240. In this embodiment, the hubs 12 and 14 are compatible with universal serial bus (USB) specification, the emulators 220A and 220B can be controllers capable of responding to the host H1 or H2. In some embodiments, the emulators can be universal serial bus (USB) device controllers, the input device 50 can be regarded as a keyboard but is not limited thereto.

In initially, the downstream ports P1 of the hubs 12 and 14 are coupled to the hosts H1 and H2 respectively and the hosts H1 and H2 enumerate the hubs 12 and 14 respectively, and the emulators 220A and 220B are not connected to the downstream ports P1 of the hubs 12 and 14 respectively.

The control unit 210 then sets the registers Reg5 and Reg1, such that the input device 50 is connected to the switch SW1 through the multiplexer M1 and the switch SW1 is turned on. Hence, the input device 50 is connected to the downstream port P1 of the hub 12, and the host H1 enumerates the input device 50. During enumeration of the input device 50, the monitoring unit 230 acquires and decodes commands at the downstream port P1 of the hub 12 and to obtain data comprising a communication address and endpoint, in which the data is provided to the input device 50 by the host H1. The monitoring unit 230 then generates a first interrupt to the control unit 210, and the control unit 210 configures the emulator 220A with the data (the communication address and endpoint) to the emulator 220A when receiving the first interrupt from the monitoring unit 230. Namely, in the embodiment, the emulator 220A is configured with the data comprising a communication address and endpoint, in which the data is provided to the input device 50 by the host H1. After this, the emulator 220A can be regarded as a pseudo input device capable of responding to the host H1.

When the input device 50 inputs an input signal comprising a standby indication, the monitoring unit 230 outputs a second interrupt serving as the first signal to the control unit 210 and enters a standby mode. For example, the standby indication can be generated by a series of keystrokes, such as Ctrl+Ctrl. In this mode, the control unit 210 sets the registers Reg1 and Reg2 such that the switch SW1 is turned off and the switch SW2 is turned on. Hence, the downstream port P1 of the hub 12 is disconnected from the input device 50 and connected to the emulator 220A. The emulator 220A generates a signal, such as negative acknowledge, non-acknowledge or no acknowledge (NAK), to reply the host H1 when the host H1 outputs a polling command, such as IN command, to poll the non-connected input device 50. Hence, the input device 50 is regarded as available by the host H1 and the host H1 retries polling the input device 50.

When the input device 50 then inputs a second input signal comprising an identifier (for example number 1) identifying the host H1, the monitoring unit 230 outputs a third interrupt to serve as the second signal for the control unit 210. When receiving the third interrupt, the control unit 210 sets the registers Reg1 and Reg2 such that the switch SW1 is turned on and the switch SW2 is turned off. For example, the input signal with the identifier can be generated by a numeral key, such as number 1, number 2 and the like, but is not limited thereto. Hence, the downstream port P1 of the hub 12 is disconnected from the emulator 220A and connected to the input device 50 again.

On the contrary, as the identifier is number 2 identifying the host H2, the monitoring unit 230 outputs a fourth interrupt to serve as the second signal to the control unit 210. When receiving the fourth interrupt, the control unit 210 sets the registers Reg3 and Reg5, such that the switch SW3 is turned on, and enables the multiplexer M1 to connect the input device 50 to the switch SW3, such that the input device 50 is connected to the downstream port P1 of the hub 14. At the same time, the control unit 210 sets the registers Reg2 to turn off the switch SW2, such that the emulator 220A is disconnected from the hub 12, and the host H1 presumes that there is no available input device.

After the input device 50 is connected to the downstream port P1 of the hub 14, the host H2 enumerates the input device 50. During enumeration of the input device 50, the monitoring unit 230 acquires and decodes commands at the downstream port P2 of the hub 14, and obtains data comprising a communication address and endpoint, in which the data is provided to the input device 50 from the host H2. The monitoring unit 230 then generates a fifth interrupt to the control unit 210, and the control unit 210 configures the emulator 220B with the data (the communication address and endpoint) when receiving the fifth interrupt from the monitoring unit 230. Namely, in the embodiment, the emulator 220B is configured with the data (the communication address and endpoint) which is provided to the input device 50 from the host H2. After this, the emulator 220B can be regarded as a pseudo input device capable of responding to the host H2.

Because the input device 50 is disconnected from the hosts H1 and H2, the second input signal comprising the identifier identifying one of the hosts H1 and H2 are not transferred to the hosts H1 and H2 when the second input signal is inputted to the resource sharing apparatus 200. Namely, the part of the switching command for the resource sharing apparatus 200, i.e., an unnecessary signal for the hosts H1 and H2, may not transferred to the hosts H1 and H2. Thus, malfunction operations can be prevented.

Figure 5:
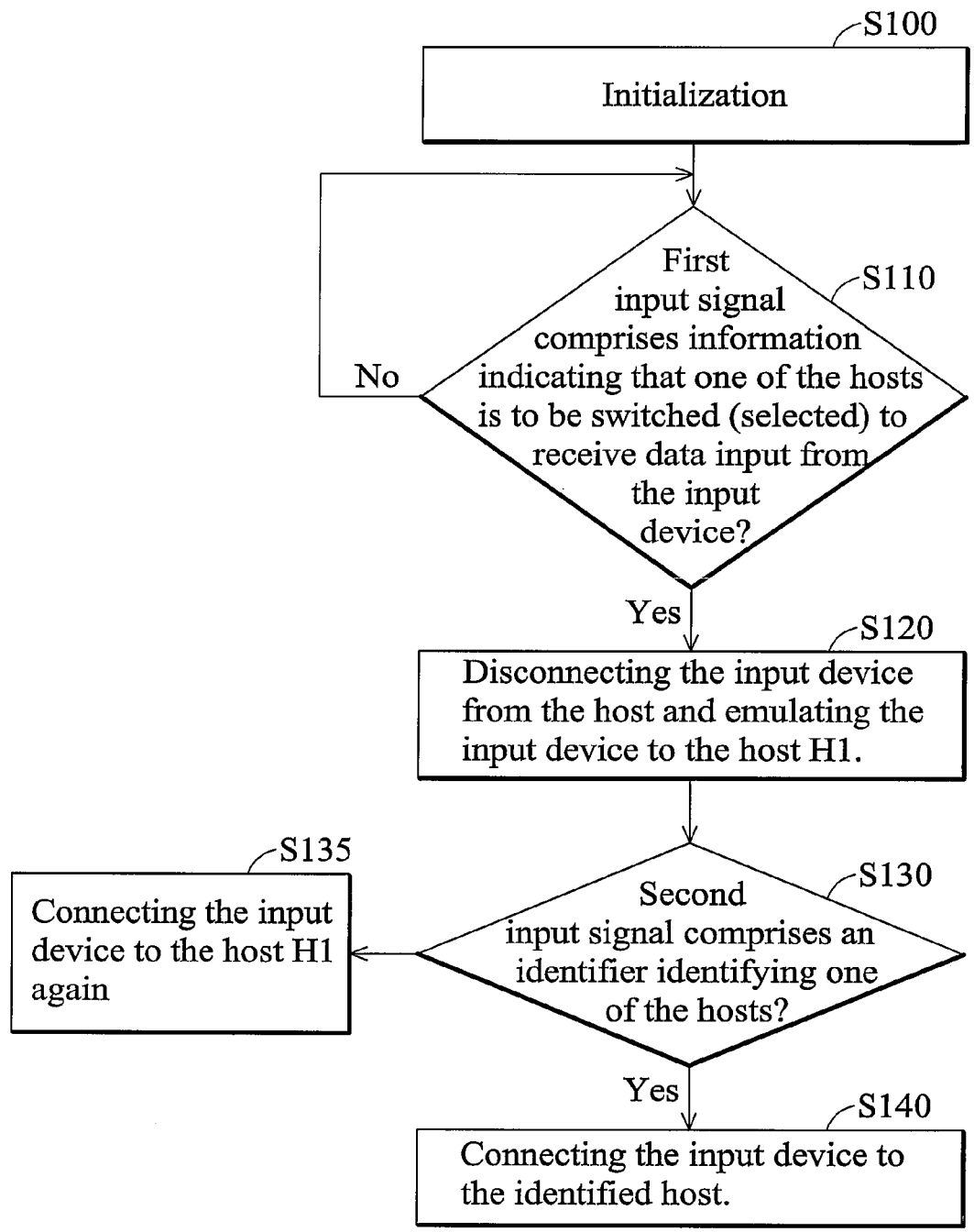
FIG. 5 is a flowchart of a method for controlling a resource sharing apparatus.

FIG. 5 shows a method for controlling a resource sharing apparatus. The resource sharing apparatus, for example, can be implemented as a keyboard video mouse (KVM) switch used to allow the same set of input devices and output devices to interact with a selected one of several hosts. The input device, for example, can be compatible with universal serial bus (USB) specification and the emulators 220A and 220B can be controllers capable of responding to the host H1 or H2. In some example, the emulators can be universal serial bus (USB) device controllers, and the input device 50 can be regarded as a keyboard, a keypad, a mouse, a stylus, a touch panel, but is not limited thereto. The hosts, for example, can be desk-top computers, servers or portable computers such as notebooks, tablet PCs, palmtops or UMPC, but are not limited thereto. Detail operations in the method are described hereinafter with reference to FIG. 4 and FIG. 5.

In step S100, an initialization is executed to couple the input device 50 to one of the hosts H1 and H2, and disconnect the emulators 220A and 220B from the hubs 12 and 14. For example, the control unit 210 can couple the input device 50 to the host H1 by multiplexers or switches.

As shown in an example of FIG. 4, upstream ports of the hubs 12 and 14 are coupled to the hosts H1 and H2 respectively and the hosts H1 and H2 enumerate the hubs 12 and 14 respectively, and the emulators 220A and 220B are not connected to the downstream ports P1 of the hubs 12 and 14 respectively. The control unit 210 then sets the registers Reg5 and Reg1, such that the input device 50 is connected to the switch SW1 through the multiplexer M1 and the switch SW1 is turned on. Hence, the downstream port P1 of the hub 12 is connected to the input device 50, the host H1 enumerates the input device 50, and thus, the host H1 can communicate with the input device 50, i.e. interact with the input device 50. At this time, there is no input device connected to the hub 14.

During enumeration of the input device 50, the monitoring unit 230 acquires and decodes commands at the downstream port P1 of the hub 12, and obtains data comprising a communication address and endpoint, in which the data is provided to the input device 50 by the host H1. The monitoring unit 230 then generates a first interrupt to the control unit 210, and the control unit 210 configures the emulator 220A with the data (the communication address and endpoint) to the emulator 220A when receiving the first interrupt from the monitoring unit 230. Namely, the emulator 220A can be regarded as a pseudo input device capable of responding to the host H1 at this time.

In step S110, whether a first (present) input signal comprises information indicating that one of the hosts H1 and H2 is to be switched (selected) to receive data input from the input device is determined. For example, such information can be regarded as a standby indication of a switching command indicating that connection between the input device 50 and the host H1/H2 may be changed (i.e., a host will be selected to receive data input from input device 50). The switching command further comprises an identifier identifying one of the first and the second hosts. If the first input signal comprises such standby indication, the nest step S120 is executed. For example, the monitoring unit 230 is coupled to the input device 50 to acquire and decode the first input signal from the input device 50 thereby determining whether the first input signal is used to control the resource sharing apparatus 400 (i.e. the standby indication) rather than to control the host H1 or the host H2. In some embodiments, the standby indication can be generated by a series of keystrokes, such as Ctrl+Ctrl. If the first input signal does not comprise such standby indication, which means that the first input signal is used to control the host H1 or the host H2, the monitoring unit 230 repeats the step S110 to detect the next input signal.

In step S120, the input device 50 is disconnected from the host H1 and the emulator 220A is configured to emulate the input device 50 to the host H1, when the first input signal comprises such standby indication. The monitoring unit 230, for example, outputs a second interrupt serving as the first signal to the control unit 210 and enters a standby mode when the acquired input signal comprises standby indication. As shown in FIG. 4, when receiving the second interrupt (i.e., the first signal) from the monitoring unit 230, the control unit 210 sets the registers Reg1 and Reg2 such that the switches SW1 and SW2 are turned off and on respectively in this mode. Hence, the downstream port P1 of the hub 12 is disconnected from the input device 50 and connected to the emulator 220A.

After being connected to the host H1, the emulator 220A generates a response signal to reply the host H1 when the host H1 outputs a polling command, such as IN command, to poll the emulator 220A, because the emulator 220A is a pseudo input device. For example, the response signal for replying the host H1 can be a negative acknowledge signal, non-acknowledge signal or a no-acknowledge (NAK) signal. Namely, the control unit 210 controls the emulator 220A to emulate the input device 50 to the host H1 when the first input signal comprises such standby indication, and thus, the input device 50 is regarded as available by the host H1 even though the input device 50 is disconnected to host H1.

In step S130, whether a second (subsequent) input signal comprises an identifier identifying one of the hosts H1 and H2 is determined. If the second input signal comprises such identifier, the next step S140 is executed. For example, the monitoring unit 230 acquires and decodes the second input signal from the input device 50 to determine whether the second input signal comprises such identifier. The information with the identifier can be generated by a numeral key, such as number 1, number 2 or the like, but is not limited thereto. For example, the number 1 represents the host H1, the number 2 represents the host H2, and so on, but is not limited thereto. If the second input signal does not comprise such identifier, step S135 is then executed, i.e., the monitoring unit 230 triggers the control unit 210 to turn on the switch SW1 and turn off the switch SW2, such that the emulator 220A is disconnected from the hub 12 and the input device 50 is coupled to the host H1 through the hub 12 again.

In step S140, the input device is connected to the identified host. For example, when the identifier, such as number 1, in the second input signal identifies the host H1, the monitoring unit 230 outputs a third interrupt to serve as the second signal for the control unit 210. When receiving the third interrupt, the control unit 210 sets the registers Reg1 and Reg2 such that the switch SW1 is turned on and the switch SW2 is turned off. Hence, the downstream port P1 of the hub 12 is disconnected from the emulator 220A and connected to the input device 50 again.

On the contrary, as the identifier is number 2 identifying the host H2, the monitoring unit 230 outputs a fourth interrupt to serve as the second signal for the control unit 210. When receiving the fourth interrupt, the control unit 210 sets the registers Reg3 and Reg5, such that the switch SW3 is turned on, and the multiplexer M1 connects the input device 50 to the switch SW3. Hence, the input device 50 is connected to the downstream port P1 of the hub 14. At this time, the control unit 210 further sets the registers Reg2 to turn off the switch SW2, such that the emulator 220A is disconnected from the hub 12, and the host H1 presumes that there is no available input device. For example, the second input signal with the identifier can be generated by a numeral key, but is not limited thereto.

After the input device 50 is connected to the downstream port P1 of the hub 14, and the host H2 enumerates the input device 50. During enumeration of the input device 50, the monitoring unit 230 acquires and decodes commands at the downstream port P2 of the hub 14, and obtains data comprising a communication address and endpoint, in which the data is provided to the input device 50 by the host H2. The monitoring unit 230 then generates a fifth interrupt to the control unit 210, such that the control unit 210 configures the emulator 220B with the data (the communication address and endpoint) to the emulator 220B when receiving the interrupt from the monitoring unit 230. Namely, the emulator 220B can be regarded as a pseudo input device capable of responding to the host H2.

Because the input device 50 has been disconnected from the hosts H1 and H2 after the resource sharing apparatus 200 receives the standby indication, the second input signal comprising the identifier identifying one of the hosts H1 and H2 is not transferred to the hosts H1 and H2 when the second input signal is inputted to the resource sharing apparatus 200. Namely, the part of the switching command for the resource sharing apparatus 200, i.e., an unnecessary signal for the hosts H1 and H2, may not be transferred to the hosts H1 and H2. Therefore, malfunction operations can be prevented.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for controlling a resource sharing apparatus coupling at least one input device to a plurality of hosts including a first host, the method comprising:
   connecting the input device to the first host;
   while the input device is connected to the first host, acquiring a first input signal from the input device and determining whether the first input signal comprises a standby indication of a switch command and wherein the standby indication is for indicating that connection between the input device and the first host can be changed; and
   in response to a determination that the first input signal comprises the standby indication, disconnecting the input device from the first host without connecting the input device to any other host and starting emulating the input device to the first host; and acquiring a second input signal from the input device, wherein the second input signal is not transferred to the hosts when it is inputted to the resource sharing apparatus.

2. The method as claimed in claim 1, wherein the input device is emulated to the first host by an emulator.

3. The method as claimed in claim 2, wherein the emulator is a universal serial bus (USB) device controller.

4. The method as claimed in claim 1, wherein emulation of the input device to the first host comprises:
  establishing a connection between the input device and an emulator; and
  outputting a responding signal indicating the presence of the input device to the first host when the first host polls the input device.

5. The method as claimed in claim 1, further comprising:
  after acquiring the first input signal, acquiring the second input signal from the input device, the second input signal being immediately subsequent to the first input signal;
  determining whether the second input signal comprising an identifier identifying one of the plurality of hosts; and
  establishing a connection between the identified host and the input device.

6. The method as claimed in claim 1, wherein the first input signal is generated by a series of keystrokes of a keyboard.

7. The method as claimed in claim 1, wherein the second input signal is generated by a numeral key of the keyboard.

8. The method as claimed in claim 1, further comprising:
  acquiring first data comprising a communication address provided to the input device by the first host during an enumeration step; and
  storing the first data to the emulator.

9. A resource sharing apparatus suitable for selectively coupling an input device to one of a plurality of hosts including a first host, comprising:
  an emulator for emulating the input device;
  a monitor for acquiring a first input signal from the input device and outputting a first signal when the first input signal comprises a standby indication of a switch command and wherein the standby indication is for indicating that connection between the input device and the first host can be changed;
  a control unit for (1) connecting the input device to the first host, and (2) in response to receiving the first signal while the input device is connected to the first host, disconnecting the input device from the first host without connecting the input device to any other host and connecting the emulator to the first host; and
  acquiring a second input signal from the input device, wherein the second input signal is not transferred to the hosts when it is inputted to the resource sharing apparatus.

10. The resource sharing apparatus as claimed in claim 9, wherein the emulator is a universal serial bus (USB) device controller.

11. The resource sharing apparatus as claimed in claim 9, further comprising a first multiplexer controlled by the control unit to selectively couple the input device or the emulator to the first host.

12. The resource sharing apparatus as claimed in claim 9, wherein the monitor further acquires the second input signal from the input device, the second input signal being immediately subsequent to the first input signal, and outputs a second signal when the second input signal comprises an identifier identifying one of the plurality of hosts, and the control unit further establishes a connection between the identified host and the input device when receiving the second signal.

13. The resource sharing apparatus as claimed in claim 9, wherein the monitor acquires first data comprising the communication address provided to the input device by the first host and asserts an interrupt, such that the control unit configures the emulator with the first data.

14. The resource sharing apparatus as claimed in claim 9, wherein the emulator outputs a responding signal indicating the presence of the input device to the first host when the first host polls the input device.

15. The resource sharing apparatus as claimed in claim 9, wherein the input device comprises a keyboard or a mouse.

16. The resource sharing apparatus as claimed in claim 11, further comprising a hub coupled between the first host and the first multiplexer.

17. The resource sharing apparatus as claimed in claim 16, wherein the hub is compatible with universal serial bus (USB) specification.

18. A resource sharing apparatus suitable for selectively coupling an input device to one of a plurality of hosts including a first host and a second host, comprising:
  a first emulator for emulating the input device;
  a second emulator for emulating the input device;
  a first multiplexer coupled between the first emulator and the first host;
  a second multiplexer coupled between the second emulator and the second host;
  a third multiplexer coupled between the input device, the first multiplexer and the second multiplexer;
  a monitor for acquiring a first input signal and a second input signal from the input device, outputting a first output signal when the first input signal comprises a standby indication of a switch command and wherein the standby indication is for indicating that connection between the input device and the first host can be changed, and outputting a second output signal when the second input signal is immediately subsequent to the first input signal and comprises an identifier identifying one of the first and the second hosts;
  a control unit for (1) connecting the input device to the first host, and (2) in response to receiving the first output signal while the input device is connected to the first host, disconnecting the input device from the first host without connecting the input device to any other host and connecting the first emulator to the first host, and for establishing a connection between the identified host and the input device when receiving the second signal; and
  wherein the second input signal is not transferred to the hosts when it is inputted to the resource sharing apparatus.

19. The resource sharing apparatus as claimed in claim 18, wherein the first host provides a communication address to the input device, the monitor acquires first data comprising the communication address and asserts an interrupt to the control unit, and the control unit configures the emulator with the first data when receiving the interrupt.

20. The resource sharing apparatus as claimed in claim 18, wherein the control unit enables the first multiplexer to couple the first emulator to the first host, and disconnect the first host and the third multiplexer, when receiving the first signal.

21. The resource sharing apparatus as claimed in claim 20, wherein the first emulator outputs a responding signal indicating the presence of the input device to the first host when the first host polls the input device.

22. The resource sharing apparatus as claimed in claim 21, wherein the control unit enables the third multiplexer to couple the input device to the second host through second multiplexer according to the second signal when the second input signal comprises an identifier identifying the second host.

23. The resource sharing apparatus as claimed in claim 18, further comprising a first hub and second hub, wherein the first hub is coupled between the first host and the first multiplexer, and the second hub is coupled between the second host and the host multiplexer.

24. The resource sharing apparatus as claimed in claim 18, wherein the resource sharing apparatus is a keyboard-video-mouse (KVM) switch.

25. The resource sharing apparatus as claimed in claim 18, wherein the input device comprises a mouse or a keyboard.

26. A method for controlling a resource sharing apparatus coupling at least one input device to a plurality of hosts including a first host, the method comprising:
   connecting the input device to the first host;
   while the input device is connected to the first host, acquiring a first input signal from the input device and determining whether the first input signal comprises a standby indication of a switch command;
   in response to a determination that the first input signal comprises the standby indication, disconnecting the input device from the first host without connecting the input device to any other host and starting emulating the input device to the first host; and
   after acquiring the first input signal, acquiring a second input signal from the input device;
   wherein the first input signal is generated by a series of keystrokes of a keyboard, the second input signal is generated by a numeral key of the keyboard, and the second input signal is not transferred to the hosts when it is inputted to the resource sharing apparatus.

27. A method for controlling a resource sharing apparatus coupling at least one input device to a plurality of hosts including a first host, the method comprising:
   connecting the input device to the first host;
   while the input device is connected to the first host, acquiring a first input signal from the input device and determining whether the first input signal comprises a standby indication of a switch command;
   in response to a determination that the first input signal comprises the standby indication, disconnecting the input device from the first host without connecting the input device to any other host and starting emulating the input device to the first host; and
   after acquiring the first input signal, acquiring a second input signal from the input device;
   wherein the second input signal is not transferred to the hosts when it is inputted to the resource sharing apparatus.

* * * * *